United States Patent
Ushiku et al.

(10) Patent No.: US 7,488,763 B2
(45) Date of Patent: Feb. 10, 2009

(54) NON-AQUEOUS INK-SET FOR INK-JET AND INK-JET RECORDING METHOD

(75) Inventors: Masayuki Ushiku, Yokohama (JP); Hisato Kato, Tokyo (JP); Manabu Kaneko, Hachioji (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 0 days.

(21) Appl. No.: 11/811,850

(22) Filed: Jun. 11, 2007

(65) Prior Publication Data

US 2007/0293601 A1    Dec. 20, 2007

(30) Foreign Application Priority Data

Jun. 14, 2006   (JP)  ............................. 2006-164414
Sep. 22, 2006   (JP)  ............................. 2006-256897

(51) Int. Cl.
    *C09D 11/00*      (2006.01)

(52) U.S. Cl. ................... 523/160; 160/31.6; 160/31.85; 347/100

(58) Field of Classification Search .............. 106/31.13, 106/218; 523/160; 524/366; 347/1, 54, 347/56, 68, 73, 100, 112
See application file for complete search history.

(56) References Cited

U.S. PATENT DOCUMENTS

| | | | |
|---|---|---|---|
| 6,698,875 B2 * | 3/2004 | Onishi et al. ................. | 347/100 |
| 6,877,851 B2 * | 4/2005 | Watanabe ..................... | 347/100 |
| 6,924,327 B2 * | 8/2005 | Sano et al. ................... | 523/160 |
| 7,001,935 B2 * | 2/2006 | Ohta et al. ................... | 523/160 |
| 7,201,791 B2 * | 4/2007 | Okamura et al. ............. | 106/31.47 |
| 7,226,498 B2 * | 6/2007 | Yamashita et al. ............ | 106/31.5 |
| 7,275,806 B2 * | 10/2007 | Matsuzawa et al. ........... | 347/43 |
| 2003/0189627 A1 | 10/2003 | Kawamura et al. | |
| 2004/0227798 A1 * | 11/2004 | Nakajima ..................... | 347/100 |
| 2005/0172854 A1 | 8/2005 | Iijima et al. | |
| 2006/0017761 A1 * | 1/2006 | Matsuzawa et al. ........... | 347/15 |
| 2006/0119682 A1 * | 6/2006 | Okamura et al. ............. | 347/100 |
| 2006/0119685 A1 * | 6/2006 | Yamashita et al. ............ | 347/100 |

FOREIGN PATENT DOCUMENTS

| | | |
|---|---|---|
| EP | 1 630 213 A1 | 3/2006 |
| JP | 2002-526631 A | 8/2002 |
| JP | 2004-359946 A | 12/2004 |
| JP | 2005-015672 A | 1/2005 |
| JP | 2005-036199 A | 2/2005 |
| JP | 2005-060716 A | 3/2005 |
| WO | WO 00/20521 A1 | 4/2000 |
| WO | WO 2004/007626 A1 | 1/2004 |
| WO | WO 2004087824 A2 * | 10/2004 |

* cited by examiner

*Primary Examiner*—Vu Anh Nguyen
*Assistant Examiner*—Vu Nguyen
(74) *Attorney, Agent, or Firm*—Frishauf, Holtz, Goodman & Chick, P.C.

(57) ABSTRACT

A non-aqueous ink-set for ink-jet recording comprising one or more inks each comprising a mixed solvent, a pigment and a resin and at least one of colors is constituted by a light colored ink and a dark colored ink different from each other in a pigment concentration, wherein a ratio ($V_1/V_2$) of viscosity ($V_1$) of the mixed solvent contained in the light colored ink to viscosity ($V_2$) of the mixed solvent contained in the dark colored ink satisfies Expression (1):

$$1.1 < V_1/V_2 < 2.5 \qquad \text{Expression (1)}.$$

12 Claims, No Drawings

NON-AQUEOUS INK-SET FOR INK-JET AND INK-JET RECORDING METHOD

This application is based on Japanese Patent Application Nos. 2006-164414 filed on Jun. 14, 2006, and 2006-256897 filed on Sep. 22, 2006, in Japanese Patent Office, the entire content of which is hereby incorporated by Reference.

TECHNICAL FIELD

The present invention relates to a non-aqueous ink-set for ink-jet, hereinafter also referred simply to as ink-set, and an ink-jet recording method using the ink-set.

TECHNICAL BACKGROUND

Recently, ink-jet recording system is begun to be applied to various fields of printing works such as photograph, various type printings and a specific printing such as that of a color filter due to easy and inexpensive image formation.

Ink-jet ink used for the ink-jet recording includes various types of ink such as an aqueous ink containing water as a principal solvent, a non-aqueous type ink containing a solvent other than water as the principal solvent, a hot-melt ink which is solid at room temperature and thermally melted for printing and an active light curable ink capable of being cured by active rays such as light, which are selected in accordance with the use.

Besides, a recording medium made from polyvinyl chloride is applied in wide using field such as a printing matter to be posted outdoor required high weatherproof capability or that to be contacted with a material body with curved surface. An ink-jet recording method is applied as a method suitable for recording on the polyvinyl chloride since in such the method plate making is not necessary and the time necessary for finishing is short so that the method suites to make small amount of diverse kinds of prints though plural methods are applicable for printing on the polyvinyl chloride medium. An ink-jet ink containing cyclohexanone is disclosed as an example of the ink-jet ink capable of recording on the recording medium made from polyvinyl chloride, cf. Patent Document 1. High anti-abrasion capability can be obtained by such the ink since cyclohexanone has high dissolving capability to polyvinyl chloride and the pigment contained in the ink comes into polyvinyl chloride. A non-aqueous ink containing N-methylpyrrolidone or an amide as the solvent is disclosed, which are weak in the odor and preferred for the working environment, cf. Patent Documents 2 and 3. Moreover a non-aqueous ink is disclosed, in which resin such as vinyl chloride-vinyl acetate copolymer or acryl resin is added for improving the strength of the image such as anti-abrasion capability, cf. Patent Documents 4 and 5.

A printing method is widely spread, in which a high color density ink and a low color density ink each having the same color are used in combination for lowering the visibility of ink dots and decreasing the granularity of image. In the case that printing method using the combination of the high color density and the low color density inks, it is found that the high color density ink and the low color density ink are difficultly ejected with sufficient stability when the driving frequency of the head is particularly high so as to cause a problem on the image formation by the high speed printing.

Patent Document 1: Japanese Translation of PCT International Application Publication No.) 2002-526631

Patent Document 2: Unexamined Japanese patent Application Publication No. (hereinafter, refereed to as JP-A) 2005-15672

Patent Document 3: JP-A 2005-60716

Patent Document 4: JP-A 2005-36199

Patent Document 5: WO 2004/007626

SUMMARY OF THE INVENTION

The invention is attained on the above background. An object of this invention is to provide a non-aqueous ink-set for ink-jet printing, which displays suitable stability for ejection in the high speed printing process and has suitability (anti-abrasion capability, glossiness and drying capability) for printing onto a recording medium of poly(vinyl alcohol), and an ink-jet recording method using such the ink-set.

The above object of this invention can be attained by the following constitution.

Item 1. A non-aqueous ink-set for ink-jet recording comprising one or more inks each comprising a mixed solvent, a pigment and a resin and at least one of colors is constituted by a light colored ink and a dark colored ink different from each other in a pigment concentration, wherein a ratio ($V_1/V_2$) of viscosity ($V_1$) of the mixed solvent contained in the light colored ink to viscosity ($V_2$) of the mixed solvent contained in the dark colored ink satisfies the following Expression (1):

$$1.1 < V_1/V_2 < 2.5 \qquad \text{Expression (1)}$$

Item 2. The non-aqueous ink-set for ink-jet recording described in Item 1 above, wherein viscosity ($V_1$) of the mixed solvent contained in the light colored ink is from 1.0 mPa·s to 3.7 mPa·s.

Item 3. The non-aqueous ink-set for ink-jet recording described in Item 1 or 2 above, wherein a mass concentration ratio of the pigments contained in the light colored ink to the dark colored ink (being a pigment concentration of the light colored ink/a pigment concentration of the dark colored ink) is from 0.1 to 0.5.

Item 4. The non-aqueous ink-set for ink-jet recording described in any one of Items 1-3 above, wherein a content of the resin contained in the light colored ink and a content of the dark colored ink is not less than 0.1 weight % and not more than 10 weight %.

Item 5. The non-aqueous ink-set for ink-jet recording described in any one of Items 1-4, wherein at least on of the mixed solvents contained in the light colored ink and the dark colored ink is a sulfur-containing heterocyclic compound.

Item 6. The non-aqueous ink-set for ink-jet recording described in Item 5, wherein the sulfur-containing heterocyclic compound is sulfolane.

Item 7. The non-aqueous ink-set for ink-jet recording described in any one of Items 1-4, wherein at least one of the mixed solvents contained in the light colored ink and the dark colored ink is a ketone series solvent.

Item 8. The non-aqueous ink-set for ink-jet recording described in Item 7, wherein the ketone series solvent is 1,3-dimethyl-2-imidazolidinone or a lactone.

Item 9. The non-aqueous ink-set for ink-jet recording described in any one of Items 1-8, wherein at least one of the resins contained in the light colored ink or/and the dark colored ink is a vinyl chloride-vinyl acetate copolymer.

Item 10. The non-aqueous ink-set for ink-jet recording described in any one of Items 1-9, wherein at least one of the resins contained in the light colored ink or/and the dark colored ink is a vinyl chloride-vinyl acetate-maleic anhydride copolymer.

Item 11. An ink-jet recording method comprising the step of:

ejecting inks on to a recording medium containing a polyvinyl chloride on a recording side to form an image employing the non-aqueous ink-set for ink-jet recording described in any one of Items 1-10.

Item 12. The ink-jet recording method described in Item 11, wherein the image is recorded with a head driving frequency of not less than 10 kHz.

A non-aqueous ink-set for ink-jet printing which displays suitable ejection stability in the high speed recording process and has high suitability (anti-abrasion capability, glossiness and drying capability) for printing onto the recording medium of poly(vinyl alcohol), and an ink-jet recording method using the ink-set can be provided by the invention.

THE BEST EMBODIMENT FOR EMBODYING THE INVENTION

The best embodiment for embodying the invention is described below.

As a result of investigation by the inventors on the foregoing background, it is found that the non-aqueous ink-set for ink-jet recording which displays suitable ejection stability in the high speed printing process and has high suitability (anti-abrasion capability, glossiness and drying capability) for printing onto the recording medium of poly(vinyl alcohol) can be realized by the non-aqueous ink-set for ink-jet recording constituted by one or more inks each comprising a mixed solvent, pigment and resin and at least on of colors is constituted by a light colored ink and a dark colored ink different from each other in the pigment concentration in which the ratio ($V_1/V_2$) of the viscosity $V_1$ of the mixed solvent contained in the light colored ink to the viscosity ($V_2$) of the mixed solvent contained in the dark colored ink satisfies the conditions defined by the foregoing Expression (1).

In the non-aqueous ink-set for ink-jet recording, hereinafter referred also to as ink-set, constituted by plural non-aqueous ink-jet inks (hereinafter, referred also to as inks), the viscosities of each of the inks are preferably controlled as near as possible for stably ejecting the ink droplets. A light colored ink prepared by simply diluting by the solvent for lowering the pigment concentration is not preferred because the viscosity of such ink becomes lower than that of the dark colored ink since the pigment concentration is made lower. Therefore, it is necessary to control the viscosity of the light colored ink by a component having higher viscosity for reducing the viscosity difference between the dark and light colored inks.

As the specific viscosity controlling means, the following means are applicable: (1) to select a pigment of which dispersion has high viscosity such as one having strong interaction between the particles, (2) to increase the adding amount of the resin or to use resin having high viscosity such as one having high molecular weight, and (3) to use a high viscosity solvent. It has been found by the inventor, however, that the ejection stability is lowered so as to make irregular the direction of the ejected droplets when the above means (1) or (2) is applied. Moreover, the means (1) is not preferable since such the means causes a problem that the stability of the dispersion is difficultly obtained. It is found by the inventors that the irregularity of the ejection direction of ink droplets can be inhibited and stable ejection can be realized by the means (3), namely the viscosity difference between the dark colored ink and the light colored ink is reduced by using the high viscous solvent.

Although the reason of that the suitable ejection stability can be obtained by the means (3) is not cleared yet, it is supposed that the interaction between the resin and the pigment is strengthen by the means (1) or (2) and the elasticity of the ink is raised so that the energy loss occurs on the occasion of ejection of droplets caused by driving the ink-jet head, and a result of that the ejection is not stably performed. Contrary to that, it is assumed that the elasticity of the ink is low when the means (3) is applied so that the ejection can be stably carried out. It is found by the inventors that a problem that satellite is difficultly controlled tends to be posed in the non-aqueous ink-jet ink when the compatibility of the injection stability of the dark colored ink and the light colored ink is intended to be made. The non-aqueous ink-jet ink is lower in the surface tension compared with the aqueous ink-jet ink. It is supposed, therefore, that the ink droplet tends to accompany a trail so as to occur the satellite.

The constitution of the non-aqueous ink-jet ink-set of the invention is concretely described below.

The non-aqueous ink-jet ink-set of the invention is characterized in that two inks, being a light colored ink and a dark colored ink different from each other in the pigment concentration, are used in at least one color ink, to obtain continuously and smoothly displaying gradation with wide density range by raising visibility and reducing the granularity of the ink dots formed on the recording medium. In such system, the weight ratio of the pigment in the light colored ink to that in the dark colored ink is preferably from 0.1 to 0.5. In this invention, the ratio of the viscosity of the light colored ink to that of the dark colored ink is preferably from 0.85 to 1.15 and more preferably from 0.9 to 1.0. The light colored ink and the dark colored ink can be easily obtained high ejection stability by controlling the viscosity balance into such the range. Please note that "non-aqueous" in this invention means that the ink of the ink-jet ink set does substantially not include water in it, and specifically a moisture weight ratio in the ink is less than 1%.

The mixed solvent to be used in this invention is described below.

The invention is characterized in that the viscosity ratio ($V_1/V_2$) is within the range of $1.1 < V_1/V_2 < 2.5$ when the viscosity of the light colored ink is $V_1$ and that of the dark colored ink is $V_2$.

In this invention, a rotation type, a vibration type and a capillary type viscometer can be applied to measure viscosity of each of the mixing solvents. For example, a Saybolt viscometer, a Redwood viscometer and a Broockfield analogical viscometer can be cited. However, the viscometer is not specifically limited as long as the viscometer is one examined using the standard solution for calibrating viscometers defined by JIS Z 8809. In this invention, the Broockfield viscometer is preferred. In this invention, the value measured at 25° C. under ordinary pressure is used though the viscosity is varied depending on the temperature and pressure on the occasion of measurement.

In this invention, viscosity $V_1$ of the mixed solvent to be used in the light colored ink is preferably not more than 3.7 mPa·s from the viewpoint of easily controlling the direction irregularity of the ejected droplets. The mixed solvent having a viscosity of less than 1.0 mPa·s is not preferable for handling the solvent since such solvent is easily scattered on the occasion of stirring or measuring and tends to be easily dried though the lower limit of the viscosity is not specifically defined. Therefore, viscosity $V_1$ is preferably not less than 1.0 mPa·s.

In this invention, it is preferable that viscosity $V_1$ of the mixed solvent to be used for the light colored ink and the viscosity $V_2$ of the mixed solvent to be used for the dark colored ink are suitably controlled by selecting and combining each of the later mentioned solvents even though the method for satisfying Expression (1) defined in this invention is not specifically limited.

A solvent having high polyvinyl chloride dissolving capability is preferably selected for giving printing suitability to polyvinyl chloride of the object of the invention to the ink since such solvent can give high anti-abrasion capability to the printed image. Besides, the using amount of such solvent is limited since the solvent sometimes deteriorates parts constituting the printer and the ink-jet head. Therefore, a diluent solvent is preferably used for controlling the viscosity of the inks. A combination of the solvent having high polyvinyl chloride dissolving capability and the diluent solvent is the mixed solvent in the invention.

As the solvent having high polyvinyl chloride dissolving capability, a heterocyclic compound is usable, for example, a ketone type solvent such as cyclohexanone, methyl ethyl ketone, N-methylpyrrolidinone and a lactone, and a sulfur-containing heterocyclic compound are preferred. The sulfur-containing heterocyclic compound of sulforane and the ketone type solvent of lactone such as 1,3-dimethyl-2-imidazolidinone and γ-butylolactone are particularly preferable for satisfying the anti-abrasion capability, glossiness and drying capability.

The adding amount of the heterocyclic compound in the ink is preferably from 2 to 20% by weight and more preferably from 3 to 10% by weight.

In the invention, an image without defects such as repelling on the occasion of printing and superior in the drying capability can be obtained by selecting the diluent solvent having high affinity with polyvinyl chloride though the principal purpose of the diluent solvent is to control the viscosity of the inks. It is preferable for obtaining the affinity to select a solvent having a solubility parameter of from 15 $MPa^{1/2}$ to 28 $MPa^{1/2}$ and more preferably from 17 $MPa^{1/2}$ to 26 $MPa^{1/2}$.

In this invention, the solubility parameter is an effective scale indicating affinity and solubility between substances. The solubility parameter in this invention is the value at 25° C. The solubility parameter is described in various documents such as J. Brandrup et al. "Polymer Handbook" Wiley-interscience Publication.

As the diluent solvent applicable in this invention, compounds represented by following Formula (1) or (2) are cited.

$R^1$—$(OX^1)_2$—O—$R^2$    Formula (1)

In above Formula (1), $R^1$ and $R^2$ are each a methyl group or an ethyl group, and $OX^1$ is an oxyethylene group or an oxyopropylene group.

Formula (2)

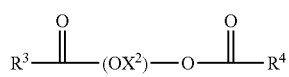

In above Formula (2), $R^3$ and $R^4$ are each a methyl group or an ethyl group, and $OX^2$ is an oxyethylene group or an oxyopropylene group.

Specific examples of the compound represented by Formula (1) or (2) include diethylene glycol dimethyl ether, diethylene glycol diethyl ether, dipropylene glycol dimethyl ether, dipropylene glycol diethyl ether, ethylene glycol diacetate and propylene glycol diacetate. Among them, at least one of the compounds represented by Formula (1) is contained as Solvent B, by which the rapidness of drying of the ink printed on polyvinyl chloride can be further improved. Moreover, at least one selected from diethylene glycol diethyl ether, dipropylene glycol dimethyl ether, dipropylene glycol diethyl ether, diethylene glycol diacetate and propylene glycol diacetate is preferably contained in Solvent B from the viewpoint of ejection stability.

Moreover, diethylene glycol diethyl ether and ethylene glycol diacetate are preferably contained and the containing ratio of them is preferably from 1:1 to 10:1. The rapid drying capability and the ejection stability can be improved by such the constitution of the ink and the odor of the ink can be also reduced.

The ink-set of the invention may contain a solvent other than the above-mentioned within the range in which the object of this invention is not vitiated. Examples of such solvent include an alkylene glycol monoalkyl ether such as diethylene glycol monoethyl ether, triethylene glycol monomethyl ether, dipropylene glycol monomethyl ether and tripropylene glycol monomethyl ether, an alkylene glycol dialkyl ether such as ethylene glycol dibutyl ether and tetraethylene glycol dimethyl ether, and an alkylene glycol monoalkyl ether acetate such as ethylene glycol monobutyl ether acetate.

Resins relating to this invention are described below.

In this invention, a resin is used for improving the fixing capability of the ink when an image is recorded by the ink. As such the resin, an acryl type resin, a polyester type resin, an ethylene-vinyl acetate copolymer, a butyral resin, a polyurethane type resin a vinyl chloride type resin and a vinyl chloride-vinyl acetate copolymer can be cited.

Concrete examples of the resin include an acryl type resin such as Johncryl produced by Johnson Polymer Co., Ltd., Eslec P produced by Sekisui Kagaku Co., Ltd., a polyester type resin such as Elitel, produced by Unitika Co., Ltd., and Vylon, produced by Toyobo Co., Ltd., an ethylene-vinyl acetate copolymer such as Evaflex, produced by Mitsui-du Pont Chemicals Co., Ltd., a butyral resin such as Eslec, produced by Sekisui Kagaku Co., Ltd., a polyurethane type resin such as Vylon UR, produced by Toyobo Co., Ltd., NT-Hi-Lamic, produced by Dainichi Seika Co., Ltd., Crysvon, produced by Dainihon Ink Kagaku Kogyo Co., Ltd., and Nipporan, produced by Nihon Polyurethane Co., Ltd., and a vinyl chloride type resin such as Solbin produced by Nisshin Kagaku Kogyo Co., Ltd., Vinibran produced by Nisshin kagaku Kogyo Co., Ltd., Salantex produced by Asahi Kasei Chemicals Co., Ltd., Sumielite produced by Sumitomo Kagaku Co., Ltd., Sekisui PVC produced by Sekisui Kagaku Kogyo Co., Ltd., and UCAR produced by The Dow Chemical Company.

The number average molecular weight of the resin preferable for compatibility of the ejection stability and the image fastness is within the range of from 10,000 to 30,000 and at least one selected from a vinyl chloride-vinyl acetate copolymer, a vinyl chloride-vinyl acetate-maleic anhydride copolymer, a vinyl chloride-vinyl acetate-vinyl alcohol copolymer and a copolymer of vinyl chloride-vinyl acetate-hydroxyalkyl acrylate is preferably contained as the constitution of the resin. The vinyl chloride-vinyl acetate-maleic anhydride copolymer particularly preferred, by which the ejection stability, the anti-abrasion capability, the drying capability and the glossiness can be improved in suitable balance. Mixing use of the vinyl chloride-vinyl acetate copolymer and the vinyl chloride-vinyl acetate-maleic anhydride copolymer is also preferred.

A usual synthesizing method such as a suspension polymerization method, an emulsion polymerization method and a solution polymerization can be applied without any limitation for synthesizing the resins relating to the invention and the solution polymerization method is particularly preferable. The solution polymerization method is one of methods applied for radical polymerization of a monomer having a vinyl group in which a monomer and an initiator are dissolved in a solvent capable of dissolving the polymer formed by the polymerization and polymerized by heating. Thus obtained resins are produced and on the market by The Dow Chemical Company, for example. More preferable resin in the invention is vinyl chloride-vinyl acetate-maleic anhydride copolymer synthesized by the solution polymerization method and preferable number average molecular weight of such the resin is within the range of from 12,000 to 20,000.

The containing amount of the resin in the ink is preferably from 1 to 10% by weight. Suitable anti-abrasion capability of the image recorded on vinyl chloride can be obtained when the resin content is not less than 1% by weight and the ejection of the ink from the ink-jet head can be easily stabilized when the resin content is not more than 10% by weight. More preferable resin content range is from 3 to 7% by weight.

The pigment relating to the invention is described below.

The weatherproof capability of the image recorded on the recording medium made from plastics such as polyvinyl chloride can be improved by using a pigment as the colorant of the non-aqueous ink-jet ink of the invention.

Any known pigments can be used as the pigment to be used in the invention without any limitation, for example, insoluble pigments, organic pigments such as lake pigments and inorganic pigments such as carbon black are preferably used.

As the insoluble pigment, for example, an azo, an azomethine, a methine, a diphenylmethane, a triphenylmethane, a quinacridone, an anthraquinone, a perylene, an indigo, a quinophthalone, an isoindolinone, an isoindoline, an azine, an oxazine, a thiazine, a dioxazine, a thiazole, a phthalocyanine and diketopyrolopyrrole type pigments are preferred.

As the pigment preferably to be used, for example, the following pigments can be cited.

Examples of a magenta and red pigment include C.I. Pigment Red 2, C.I. Pigment Red 3, C.I. Pigment Red 5, C.I. Pigment Red 6, C.I. Pigment Red 7, C.I. Pigment Red 12, C.I. Pigment Red 15, C.I. Pigment Red 16, C.I. Pigment Red 48 (Ca), C.I. Pigment Red 48 (Mn), C.I. Pigment Red 48:1, C.I. Pigment Red 53:1, C.I. Pigment Red 57 (Ca), C.I. Pigment Red 57:1, C.I. Pigment Red 112, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 168, C.I. Pigment Red 168, C.I. Pigment Red 177, C.I. Pigment Red 178, C.I. Pigment Red 184, C.I. Pigment Red 202, C.I. Pigment Red 209, C.I. Pigment Red 222, C.I. Pigment Red 254 and C.I. Pigment Violet 19.

Examples of an orange or yellow pigment include C.I. Pigment Orange 32, C.I. Pigment Orange 43, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, C.I. Pigment Yellow 213 and C.I. Pigment Yellow 214.

Examples of a green or cyan pigment include C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15;4, C.I. Pigment Blue 16, C.I. Pigment Blue 22, C.I. Pigment Blue 60 and C.I. Pigment Green 7.

When red, green, blue or intermediate color is required other than the above, the following pigments are preferably used singly or in combination, for example, C.I. Pigment Reds 209, 224, 177 and 194;
C.I. Pigment Orange 43;
C.I. Vat Violet 3;
C.I. Pigment Violets 19, 23 and 37;
C.I. Pigment Green 7 and 36; and
C.I. Pigment Blue 15:6.

As a black pigment, for example, C.I. Pigment Black 1, C.I. Pigment Black 6 and C.I. Pigment Black 7 can be cited.

In the invention, the pigment content in the dark colored ink is preferably from 2 to 10% by weight. The pigment content in the light colored ink is preferably from 0.5 to 0.1 times of that in the dark colored ink.

The pigments relating to the invention are preferably used after dispersed by a dispersing machine together with a surfactant and an additive necessary for satisfying a designated purpose. As the dispersing machine, known dispersing machines such as a ball mill, a sand mill, an attriter, a roller mill, an agitator, a Henschel mixer, a colloid mill, an ultrasonic homogenizer, a pearl mill, a wet jet mill and a paint shaker are applicable.

The average particle diameter of the pigment dispersion to be used in the ink of the invention is preferably from 10 nm to 200 nm, and more preferably from 50 nm to 150 nm. The aggregation of the particles can be inhibited by making the average particle diameter to not less than 10 nm and the sedimentation of the pigment during storage for a prolonged period can be easily controlled by making the average particle diameter to not more than 200 nm. Therefore, the ink having good storaging stability easily can be obtained by making the average particle diameter into the above range.

The particle diameter of the pigment dispersion can be measured by a particle diameter measuring apparatus available on the market utilizing a light scattering method, an electrophoretic method or a laser Doppler method. The average particle diameter also can be measured by using an electron microscope. In such the case, 100 or more particles are photographed and the resultant images are subjected to statistic treatment by using an image analyzing software such as Image-Pro, produced by Mediacybernetics Co., Ltd.

As the pigment dispersing agent, a surfactant and a polymer dispersant are usable and the polymer dispersant is preferred. Examples of the polymer dispersant include a (meth)acryl type resin, a styrene-(meth)acryl type resin, a hydroxyl group-containing carboxylic acid ester, a salt of a long chain polyaminoamide and a high molecular weight acid ester, a salt of high molecular weight polycarboxylic acid, a salt of a long chain polyaminoamide and a polar acid ester, a high molecular weight unsaturated acid ester, a modified polyurethane, a modified polyacrylate, a poly ether ester type anionic surfactant, a naphthalene sulfonic acid formalin condensate salt, an aromatic sulfonate formalin condensate salt, a polyoxyethylene alkylphosphate, polyoxyethylene nonylphenyl ether, stearylamine acetate and a pigment derivative.

Specifically, Johncryl manufactured by Johnson Polymer Co., Ltd., Anti-Terra-U produced by BYK-Chemie GmbH, Disperbyk produced by BYK-Chemie GmbH, Efka produced by Efka Chemicals Co., Ltd., Flowlen produced by Kyoei Kagaku Co., Ltd., Disparon produced by Kusumoto Kasei Co., Ltd., Ajisper produced by Ajinomoto Fine-Techno Co., Inc., Demol, Homogenol and Emulgen each produced by Kao Corp., Solaparse produced by Avecia Ltd., and Nikkol produced by Nikko Chemical Co., Ltd., are cited.

The dispersant content of the ink-jet ink of the invention is preferably from 10 to 200% by weight. The stability of the pigment dispersion is raised in the range of not less than 10% by weight and the ejection of the ink from the ink-jet head can be easily stabilized by making the content to not more than 200% by weight.

In the ink-jet ink of the invention, various kinds of known additive such as a viscosity controlling agent, a relative resistivity controlling agent, a film forming agent, a UV absorbent, an antioxidant, an anti-color fading agent, an anti-mold agent and a rust preventive may be added additional to the foregoing materials corresponding to the purposes of improving various properties of the ink such as the ejection stability, suitability for the print head or the ink cartridge and the durability of image.

The ink-jet head to be used on the occasion of image formation by ejecting the ink-jet ink relating to the invention may be either an on-demand type or a continuous type. The ejection system may be any of an electro-mechanical conversion system such as a single cavity type, a double cavity type, a bender type, a piston type, a share mode type and a shared wall type, and an electro-thermal conversion system such as a thermal ink-jet type and Bubble Jet® type.

In the ink-jet recording method using the ink-jet ink of the invention, an ink-jet recorded image can be obtained by ejecting the ink from the ink-jet head according to digital signals and adhering onto the recording medium using, for example, a printer in which the ink is charged. The image formation while raising the surface temperature of the image recording medium is preferable for fast and surely drying the ink adhering on the recording medium. The surface temperature is preferably from 40 to 100° C. though the temperature is controlled corresponding to the durability of the recording medium or the drying capability of the ink. Particularly, it is more preferable that the recording is carried out while raising the surface temperature because the wetting capability of the ink with the recording medium surface is improved when polyvinyl chloride is used as the recording medium. The wetting capability and the drying capability of the ink are sometimes varied depending on the kind of the polyvinyl chloride. Therefore, the surface temperature may be controlled according to the properties of the recording medium.

When the recording is carried out while the surface temperature of the recording medium is raised, a heater is preferably installed in the ink-jet recording apparatus. The surface temperature of the recording medium can be controlled by only the ink-jet recording apparatus by heating the recording medium before or during transportation of the recording medium by the installed heater.

The recording medium to be used in the ink-jet recording method of this invention is characterized in that the medium is made from polyvinyl chloride. Specific examples of the recording medium composed of polyvinyl chloride include SOL-371G, SOL-373M and SOL-4701 each produced by VIGteQnos Co., Ltd., Glossy Vinyl Chloride produced by System Graphi Co., Ltd., KSM-VS, KSM-VST and KSM-VT, both produced by Kimoto Co., J-CAL-HGX, J-CAL-YHG and J-CAL-WWWG each produced by Kyosho Osaka Co., Ltd., BUS MARK V400 F vinyl and LITECcal V-600 vinyl each produced by Flexcon Co., Ltd., FR2 produced by Hanwah Co., Ltd., LLBAU13713 and LLSP20133, both produced by Sakurai Co., Ltd., P-370B and P-400M each produced by Kanbo Pras Co., Ltd., S02P, S13P, S14P, S22P, S24P, S34P and S27P all produced by Grafityp Co., Ltd., P-223RW, P-224RW and P-284ZC, all produced by Lintec Co., Ltd., LKG-19, LPA-70, LPE-248, LPM-45, LTG-11 and LTG-21 each produced by Shinseisha Co., Ltd., MP13023 produced by Toyo Corporation Co., Ltd., Napoleon Gloss glossy vinyl chloride produced by Niki Electronics Co., Ltd., Ltd., JV-610 and Y-114 each produced by IKC Co., Ltd., NIJ-CAPVC and NIJ-SPVCGT each produced by Nitie Corp., 3101/H12/P4, 3104/H12/P4, 3104/H12/P4S, 9800/H12/P4, 3100/H12/R2, 3101/H12/R2, 3104/H12/R2, 1445/H14/P3 and 1438/One Way Vision, all produced by Interocoat GmbH, JT5129PM, JT5128P, JT5822P, JT5829P, JT5829R, JT5829PM, JT5829RM and JT5929PM each produced by MACtac (being Morgan Adhesives Company), MPI11005, MPI1900, MPI2000, MPI2001, MPI2002, MPI3000, MPI3021, MPI3500 and MPI3501, all produced by Avery Co., Ltd., MA-101G and MA-501G, both produced by Gin'ich Co., Ltd., FR2 produced by Hanfa Japan Co., Ltd., AY-15P, AY-60P, AY-80P, DBSP137GGH and DBSP137GGL all produced by Insite Co., Ltd., SJT-V200F and SJT-V400F-1, all produced by Hiraoka Shokusen Co., Ltd., SPS-98, SPSM-98, SPSH-98, SVGL-137, SVGS-137, MD3-200, MD3-301M, MD5-100, MD5-101M and MD%-105, all produced by Metamark Co., Ltd., 640M, 641G, 641M, 3105M, 3105SG, 3162G, 3164G, 3164M, 3164XG, 3164XM, 3165G, 3165SG, 3165M, 3451SG, 3551G, 3551M, 3631, 3141M, 3651G, 3651M, 3651SG, 3951G and 3641M, all produced by Orafol Co., Ltd., SVTL-HQ130 produced by Lami Corporation Co., Ltd., SP300 GWF and SPE-CLEAD vinyl both produced by Catalina Co., Ltd., RM-SJR produced by Ryoyo Shoji Co., Ltd., Hi Lucky and New Lucky PVC produced by LG Co., Ltd., SIY-110, SIY-310 and SIY-320 all produced by Sekisui Co., Ltd., PRINT MI Frontlit and PRINT XL Light weight banner both produced by Endutex Co., Ltd., RILET 100, RIJET 145 and RIJET 165 both produced by Ritrama Co., Ltd., NM-SG and NM-SM produced by Nichiei Kako Co., Ltd., LTO3SG produced by Lukio Co., Ltd., Easy Print 80 and Performance Print 80 produced by Jetgraph Co., Ltd., DSE 550, DSB550, DSE 800G, DSE 802/137, V250WG, V300WG and V350WG, all produced by Hexis Co., Ltd., and Digital White 6005PE and 6010PE produced by Multifix Co., Ltd.

EXAMPLES

The invention is concretely described referring examples below though the invention is not limited to them. In the invention, "part" and "%" are each "part by weight" and "% by weight", respectively, as long as any specific comment is not attached.

Example 1

<<Preparation of Ink-set>>
[Preparation of Pigment Dispersion]
<Preparation of Pigment Dispersion 1>

Twelve parts of C.I. Pigment Red 122 as the pigment, 5 parts of Solsperse 24000 produced by I.C.I Japan Co., Ltd., as the pigment dispersant and 83 parts of diethylene glycol diethyl ether were mixed and dispersed by a horizontal type beads mill System Zeta mini, manufactured by Ashizawa Co., Ltd., filled by 60% by volume of zirconia beads having a diameter of 0.5 mm. After that the zirconia beads were removed to obtain Pigment Dispersion 1. The viscosity of Pigment Dispersion 1 measured at 25° C. was 18.4 mPa·s.

<Preparation of Pigment Dispersion 2>

Pigment Dispersion 2 was prepared in the same manner as in Pigment Dispersion 2 except that the pigment was replaced by C.I. Pigment Violet 19. The viscosity of Pigment Dispersion 2 measured at 25° C. was 80.4 mPa·s.

[Preparation of Ink-set 1]

<Preparation of Dark Colored Ink 1>

Five parts of vinyl chloride-vinyl acetate copolymer (VYHD produced by The Dow Chemical Company, number average molecular weight: 22,000) was gradually added to a solvent composed of 32 parts of diethylene glycol diethyl ether, 6 parts of 1,3-dimethyl-2-imidazolidinone and 15 parts of ethylene diacetate and stirred and dissolved to prepare Solution A.

To 42 parts of the above Pigment Dispersion 1, Solution A was entirely added while stirring and then filtered by a filter of 0.8 µm. Thus Dark Colored Ink 1 was obtained.

The ratio of each of the components in the Dark Colored Ink 1 (100 parts) are shown below.

| | |
|---|---|
| C.I. Pigment Red 122 | 5 parts |
| Solsperse 24000 | 2.1 parts |
| Diethylene glycol diethyl ether | 66.9 parts |
| 1,3-dimethyl-2-imidazolidinone | 6 parts |
| Ethylene-2-acetic acid | 15 parts |
| Vinyl chloride-vinyl acetate copolymer | 5 parts |

The viscosity of the above prepared Dark Colored Ink 1 measured at 25° C. under ordinary pressure was 8.51 mPas·s. The viscosity of the mixed solvent composed of 66.9 parts of diethylene glycol diethyl ether, 6 parts of 1,3-dimethyl-2-imidazolidinone and 15 parts of ethylene diacetate measured at 25° C. under ordinary pressure was 1.48 mPas·s.

<Preparation of Light Colored Ink 1>

Light Colored Ink 1 was prepared in the same manner as in Dark Colored Ink 1 except that the adding amount of Pigment Dispersion 1 was varied to 8.1 parts and the adding amount of diethylene glycol diethyl ether was varied to 65.9 parts.

The ratio of each of the components in the Light Colored Ink 2 (100 parts) are shown below.

| | |
|---|---|
| C.I. Pigment Red 122 | 1 part |
| Solsperse 24000 | 0.4 parts |
| Diethylene glycol diethyl ether | 72.6 parts |
| 1,3-dimethyl-2-imidazolidinone | 6 parts |
| Ethylene-2-acetic acid | 15 parts |
| Vinyl chloride-vinyl acetate copolymer | 5 parts |

The viscosity of the above prepared Light Colored Ink 1 measured at 25° C. under ordinary pressure was 6.96 mPas·s. The viscosity of the mixed solvent composed of 72.6 parts of diethylene glycol diethyl ether, 6 parts of 1,3-dimethyl-2-imidazolidinone and 15 parts of ethylene diacetate measured at 25° C. under ordinary pressure was 1.46 mPas·s.

The combination of Dark Colored Ink 1 and Light Colored Ink 1 was referred to as Ink-set 1.

[Preparation of Ink-sets 2 to 7]

Ink-sets 2 to 7 were prepared in the same manner as in Ink-set 1 except that the kind and the ratios of the components of the mixed solvent to be used for the high and light colored inks were varied as shown in table 1.

[Preparation of Ink-set 8]

Ink-set 8 was prepared in the same manner as in Ink-set 1 except that the adding amount of resin (VYHD) used for preparing Light Colored Ink 1 was varied to 5.5 parts and the kind and the ratios of the components were varied as shown in Table 1.

[Preparation of Ink-set 9]

Ink-set 9 was prepared in the same manner as in Ink-set 1 except that the resin (VYHD) used in Light Colored Ink 1 was replaced by vinyl chloride-vinyl acetate copolymer (Commercial name, VYHH, manufactured The Dow Chemical Company, number average molecular weight: 27,000).

[Preparation of Ink-set 10]

Ink-set 10 was prepared in the same manner as I Ink-set 1 except that Pigment Dispersion 1 used for preparing Light Colored Ink 1 was replaced by Pigment Dispersion 2.

TABLE 1

| Inkset No. | Kind of ink | Mixed solvent | | | | | | Resin | | Viscosity of ink (mPa·s) | Remarks |
|---|---|---|---|---|---|---|---|---|---|---|---|
| | | Adding amount of DEDG (%) | Adding amount of DMID (%) | Adding amount of ethylene diacetate (%) | Adding amount of TeEGMBE (%) | Viscosity of solvent (mPa·s) | Viscosity ratio ($V_1/V_2$) | Kind | Adding amount (%) | Kind of pigment | |
| 1 | *1 | 68.3 | 6.0 | 15.0 | — | 1.48 | 0.99 | VYHD | 5.0 | PR122 | 8.51 | Comp. |
| | *2 | 72.6 | 6.0 | 15.0 | — | 1.46 | | VYHD | 5.0 | PR122 | 6.96 | |
| 2 | *1 | 68.3 | 6.0 | 15.0 | — | 1.48 | 1.14 | VYHD | 5.0 | PR122 | 8.51 | Inv. |
| | *2 | 65.0 | 6.0 | 15.0 | 7.6 | 1.69 | | VYHD | 5.0 | PR122 | 7.40 | |
| 3 | *1 | 68.3 | 6.0 | 15.0 | — | 1.48 | 1.53 | VYHD | 5.0 | PR122 | 8.51 | Inv. |
| | *2 | 50.6 | 6.0 | 15.0 | 22.0 | 2.26 | | VYHD | 5.0 | PR122 | 7.90 | |
| 4 | *1 | 68.3 | 6.0 | 15.0 | — | 1.48 | 2.45 | VYHD | 5.0 | PR122 | 8.51 | Inv. |
| | *2 | 27.1 | 6.0 | 15.0 | 45.5 | 3.63 | | VYHD | 5.0 | PR122 | 9.46 | |
| 5 | *1 | 68.3 | 6.0 | 15.0 | — | 1.48 | 2.78 | VYHD | 5.0 | PR122 | 8.51 | Comp. |
| | *2 | 21.0 | 6.0 | 15.0 | 51.6 | 4.11 | | VYHD | 5.0 | PR122 | 10.12 | |
| 6 | *1 | 43.1 | 6.0 | 15.0 | 25.2 | 2.42 | 1.53 | VYHD | 5.0 | PR122 | 10.10 | Inv. |
| | *2 | 26.5 | 6.0 | 15.0 | 46.1 | 3.70 | | VYHD | 5.0 | PR122 | 9.61 | |
| 7 | *1 | 41.3 | 6.0 | 15.0 | 27.0 | 2.50 | 1.53 | VYHD | 5.0 | PR122 | 10.25 | Inv. |
| | *2 | 24.5 | 6.0 | 15.0 | 48.1 | 3.83 | | VYHD | 5.0 | PR122 | 9.76 | |
| 8 | *1 | 68.3 | 6.0 | 15.0 | — | 1.48 | 0.99 | VYHD | 5.0 | PR122 | 8.51 | Comp. |
| | *2 | 72.6 | 6.0 | 15.0 | — | 1.46 | | VYHD | 5.5 | PR122 | 8.03 | |

TABLE 1-continued

|  |  | Mixed solvent | | | | | | Resin | | | Viscosity | |
|---|---|---|---|---|---|---|---|---|---|---|---|---|
| Inkset No. | Kind of ink | Adding amount of DEDG (%) | Adding amount of DMID (%) | Adding amount of ethylene diacetate (%) | Adding amount of TeEGMBE (%) | Viscosity of solvent (mPa·s) | Viscosity ratio (V$_1$/V$_2$) | Kind | Adding amount (%) | Kind of pigment | of ink (mPa·s) | Remarks |
| 9 | *1 | 68.3 | 6.0 | 15.0 | — | 1.48 | 0.99 | VYHD | 5.0 | PR122 | 8.51 | Comp. |
|  | *2 | 72.6 | 6.0 | 15.0 | — | 1.46 |  | VYHH | 5.0 | PR122 | 8.41 |  |
| 10 | *1 | 68.3 | 6.0 | 15.0 | — | 1.48 | 0.99 | VYHD | 5.0 | PR122 | 8.51 | Comp. |
|  | *2 | 72.6 | 6.0 | 15.0 | — | 1.46 |  | VYHD | 5.0 | PV19 | 8.28 |  |

*1: Dark colored ink,
*2: Light colored ink,
Comp.: Comparative,
Inv.: Inventive Details of additives each described in abbreviation in Table 1 are as follows.

<Mixed Solvent>
DEDG: Diethylene glycol diethyl ether
DMID: 1,3-dimethyl-2-imidazolidinone
TeEGMBE: Tetramethylene glycol monobutyl ether <Resin>
VYHD: Vinyl chloride-vinyl acetate type copolymer produced by The Dow Chemical Company, number average molecular weight: 22,000
VYHH: Vinyl chloride-vinyl acetate type copolymer produced by The Dow Chemical Company, number average molecular weight: 27,000

<Pigment>
PR122: C.I. Pigment Red 122
PV19: C.I. Pigment Violet 19

<<Evaluation of Ink-set>>

The above prepared ink-sets were subjected to the evaluation on the ejection suitability and the image formation.

[Evaluation of Ejection Stability]

The ink-sets were each set in an on-demand type ink-jet printer which has the maximum recording density 1440× 1440 dpi, a heater and a piezo type head having a nozzle diameter of 28 μm, a driving frequency of 7 kHz, a nozzle number of 512, the minimum droplet volume of 14 pl, a nozzle density of 180 dpi; dip is number of the dot per inch.

Then a lattice pattern was recorded using the dark colored ink for the main scanning direction lines and the light colored ink for the sub-scanning direction lines. The width of each of the lines was about 0.3 mm and the interval of the lattice lines was about 1 mm, and the size of the lattice pattern was 10 cm square. As the recording medium, JT5929 made from poly (vinyl chloride, produced by Mactac Co., Ltd., was used. The temperature of the recording medium was held at 40° C. during the printing by heating from the backside by the heater. The surface temperature of the recording medium was measured by a non-contacting type thermometer IT-530 manufactured by Horiba Seisakusho Co., Ltd. The lattice pattern images were printed at head driving frequencies of 7 kHz, 10 kHz and 15 kHz, respectively, and evaluated according to the following norms.

A: Uniform images were obtained without and curve and interruption of the lattice lines.

B: Curved lattice lines were observed but the lines were not interrupted; the level of the images was acceptable.

C: The lattice lines were curved and interrupted and ununiformity of image are partially occurred.

Besides, flying situation of each of the inks was monitored by using a strobe type ink flying observation apparatus described in JP-A 2002-363469 in which the flying ink droplets were observed by a CCD camera under a condition of synchronizing the ejection cycle and the lighting cycle. As a result of that, lowering of the droplet speed and lacking of the droplet flying were observed at some nozzles when the ink causing the curve and the interruption of the line was used.

[Evaluation of Image]

<Evaluation of Anti-abrasion Capability>

The lattice image formed at a head driving frequency of 7 kHz used for the evaluation of ejection stability was rubbed by a dry cotton cloth (unbleached muslin No. 3) and the anti-abrasion capability of the image was evaluated according to the following norms.

A: The image was almost not varied after rubbing of 51 or more times.

B: The cotton cloth (unbleached muslin No. 3) was slightly colored after the rubbing of 50 times but the printed image was little influenced.

C: Damages occurred on the lattice image during the rubbing of 20 times.

<Evaluation of Drying Capability>

Solid images adjacent to each other were printed the dark colored and light colored inks, respectively, at a head driving frequency of 7 kHz using the printer and the recording medium the same as used in the evaluation of the ejection stability. During the printing, the surface temperature of the recording medium was controlled at 40° C. by heating from the backside of the medium by a heater.

After recording the images, the surface of the solid images was rubbed by finger and the drying capability of the ink was evaluated according to the following norms.

A: The image became not peelable within the time range from just after printing to less than 3 minutes.

B: The image became not peelable within the time range from 3 to less than 5 minutes.

C: The time necessary for making the image to be not peelable was 5 minutes or more.

<Evaluation of Glossiness>

The glossiness of the solid image printed by the dark colored ink (dark color printed portion), the solid image printed by the light colored ink (light color printed portion) each printed in the same manner as in the above and a portion without any image (unprinted portion) were visually observed and evaluated according to the following norms.

A: The dark color printed portion, the light color printed portion and the unprinted portion were similar in the glossiness and the image was superior in the glossiness.

B: Some degree of difference in the glossiness was observed between any of the dark color printed portion, the light color printed portion and the unprinted portion, but the glossiness was acceptable level.

C: Any one of the dark color printed portion and the light color printed portion was hazed and the image was lacked in the clarity.

Results obtained by the above evaluation are listed in Table 2.

TABLE 2

| Ink-set No. | Ejection stability 7 kHz | Ejection stability 10 kHz | Ejection stability 15 kHz | Drying capability | Anti-abrasion capability | Glossiness | Remarks |
|---|---|---|---|---|---|---|---|
| 1 | B | C | C | A | A | A | Comparative |
| 2 | A | B | B | A | A | A | Inventive |
| 3 | A | A | B | A | A | A | Inventive |
| 4 | A | A | B | A | A | A | Inventive |
| 5 | B | C | C | A | A | A | Comparative |
| 6 | A | A | B | A | A | A | Inventive |
| 7 | A | B | B | A | A | A | Inventive |
| 8 | B | C | C | A | A | A | Comparative |
| 9 | B | C | C | A | A | A | Comparative |
| 10 | B | C | C | A | A | B | Comparative |

As is cleared from the results in shown in Table 2, the ink-sets of the invention form images without any curving and interruption or stably form the images acceptable for practical use at both of the driving frequencies of 10 kHz and 15 kHz. Contrary to that, curves and interruptions of the image were caused in the images formed by the comparative ink-sets and stable ink ejection cannot be obtained. The results of the image evaluations were within the acceptable range as to any of the ink-sets.

Example 2

<<Preparation of Ink-jet Ink>>
[Preparation of Pigment Dispersion 3]

Pigment Dispersion 3 was prepared in the same manner as in Pigment Dispersion 1 described in Example 1 except that the pigment was replaced by C.I. Pigment Blue 15:4. The viscosity of Pigment Dispersion 3 measured at 25° C. under ordinary pressure was 18.6 mPas·s.

[Preparation of Ink-set 11]

Ink-set 11 was prepared in the same manner as in Ink-set 3 described in Example 1 except that Pigment Dispersion 1 was replaced by Pigment Dispersion 3.

Ink-sets 12 to 22 were prepared in the same manner as in Ink-set 11 except that the resin and the ketone type solvent dimethylimidazolidinone were changed as shown in Table 3.

The viscosity of each of the inks and the mixed solvents used in the ink sets for preparing Ink-sets 12 to 22 were measured at 25° C. under ordinary pressured, and the results of the measurements were listed in Table 3.

TABLE 3

| Inkset No. | Kind of ink | Mixed solvent Adding amount of DEDG (%) | Adding amount of DMID (%) | Adding amount of 2EA (%) | Adding amount of TeEGMBE (%) | Another solvent Kind | Adding amount (%) | Viscosity of solvent (mPa·s) | Viscosity ratio ($V_1/V_2$) | Resin Kind | Adding amount (%) | Viscosity of ink (mPa·s) | Remarks |
|---|---|---|---|---|---|---|---|---|---|---|---|---|---|
| 11 | *1 | 68.3 | 6.0 | 15.0 | — | — | — | 1.48 | 1.53 | VYHD | 5.0 | 8.51 | Inv. |
|  | *2 | 50.6 | 6.0 | 15.0 | 22.0 | — | — | 2.26 |  | VYHD | 5.0 | 7.90 |  |
| 12 | *1 | 68.3 | 6.0 | 15.0 | — | — | — | 1.48 | 1.53 | VMCA | 5.0 | 7.43 | Inv. |
|  | *2 | 50.6 | 6.0 | 15.0 | 22.0 | — | — | 2.26 |  | VMCA | 5.0 | 6.90 |  |
| 13 | *1 | 68.3 | 6.0 | 15.0 | — | — | — | 1.48 | 1.53 | Acryl | 5.0 | 8.02 | Inv. |
|  | *2 | 50.6 | 6.0 | 15.0 | 22.0 | — | — | 2.26 |  | Acryl | 5.0 | 7.43 |  |
| 14 | *1 | 68.3 | 6.0 | 15.0 | — | — | — | 2.42 | 1.53 | *3 | 5.0 | 8.53 | Inv. |
|  | *2 | 50.6 | 6.0 | 15.0 | 22.0 | — | — | 3.70 |  | *3 | 5.0 | 7.94 |  |
| 15 | *1 | 68.3 | 6.0 | 15.0 | — | — | — | 1.48 | 1.53 | Butyral | 5.0 | 8.34 | Inv. |
|  | *2 | 50.6 | 6.0 | 15.0 | 22.0 | — | — | 2.26 |  | Butyral | 5.0 | 7.96 |  |
| 16 | *1 | 68.3 | — | 15.0 | — | γ-BL | 6.0 | 1.48 | 1.52 | VMCA | 5.0 | 8.51 | Inv. |
|  | *2 | 50.6 | — | 15.0 | 22.0 | γ-BL | 6.0 | 2.25 |  | VMCA | 5.0 | 7.88 |  |
| 17 | *1 | 68.3 | — | 15.0 | — | CH | 6.0 | 1.44 | 1.53 | VMCA | 5.0 | 8.50 | Inv. |
|  | *2 | 50.6 | — | 15.0 | 22.0 | CH | 6.0 | 2.21 |  | VMCA | 5.0 | 7.86 |  |
| 18 | *1 | 68.3 | — | 15.0 | — | MP | 6.0 | 1.44 | 1.54 | VMCA | 5.0 | 8.51 | Inv. |
|  | *2 | 50.6 | — | 15.0 | 22.0 | MP | 6.0 | 2.22 |  | VMCA | 5.5 | 7.88 |  |
| 19 | *1 | 68.3 | — | 15.0 | — | PyD | 6.0 | 1.52 | 1.51 | VMCA | 5.0 | 8.56 | Inv. |
|  | *2 | 50.6 | — | 15.0 | 22.0 | PyD | 6.0 | 2.30 |  | VMCA | 5.0 | 8.00 |  |
| 20 | *1 | 68.3 | — | 15.0 | — | Sulforane | 6.0 | 1.62 | 1.49 | VMCA | 5.0 | 8.73 | Inv. |
|  | *2 | 50.6 | — | 15.0 | 22.0 | Sulforane | 6.0 | 2.42 |  | VMCA | 5.0 | 8.18 |  |
| 21 | *1 | 68.3 | — | 15.0 | — | Sulforane | 6.0 | 1.62 | 0.99 | VMCA | 5.0 | 8.73 | Comp. |
|  | *2 | 72.6 | — | 15.0 | — | Sulforane | 6.0 | 1.60 |  | VMCA | 5.0 | 7.23 |  |
| 22 | *1 | 68.3 | — | 15.0 | — | Sulforane | 6.0 | 1.62 | 2.74 | VMCA | 5.0 | 8.56 | Comp. |
|  | *2 | 21.6 | — | 15.0 | 51.0 | Sulforane | 6.0 | 4.44 |  | VMCA | 5.0 | 10.56 |  |

*1: Dark colored ink,
*2: Light colored ink,
*3: Ethylene/vinyl acetate
Inv.: Inventive,
Comp.: Comparative Details of each of the additives described in abbreviate in Table 3 are as follows.

<Mixed Solvent>
DEDG: Diethylene glycol diethyl ether
DMID: 1,3-dimethyl-2-imidazolidinone
2EA: 2-ethylene acetate
TeEGMBE: Tetraethylene glycol monobutyl ether
BL: γ-butyl-lactone
CH: Cyclohexanone
MP: N-methylpyrrolidone
PyD: 2-pyrrolidone
<Resin>
VYHD: Vinyl chloride-vinyl acetate type copolymer, produced by The Dow Chemical Company, number average molecular weight: 22,000
VMCA: Vinyl chloride-vinyl acetate-maleic anhydride type copolymer, produced by The Dow Chemical Company.
Acryl: Butyl methacrylate-methyl methacrylate copolymer Deglan P24, produced by Degussa Co., Ltd.
*1: Ethylene-vinyl acetate copolymer Evaflex, produced by Mitsui-du Pont Chemicals Co.
Butyral: Poly(vinyl butyral) resin Eslec BL-1, produced by Sekisui Kagaku Co., Ltd.

<<Evaluation of Ink-set>>

The above prepared ink-sets were evaluated as to the ejection stability and the printed image in the same manner as in Example 1. Thus obtained results are listed in Table 4.

TABLE 4

| Ink-set No. | Ejection stability | | | Anti- | | | Remarks |
|---|---|---|---|---|---|---|---|
| | 7 kHz | 10 kHz | 15 kHz | Drying capability | abrasion capability | Glossiness | |
| 11 | A | A | B | A | A | A | Inventive |
| 12 | A | A | A | A | A | A | Inventive |
| 13 | A | A | B | A | A | B | Inventive |
| 14 | A | A | B | A | A | B | Inventive |
| 15 | A | A | B | B | A | A | Inventive |
| 16 | A | A | A | A | A | A | Inventive |
| 17 | A | A | A | A | A | B | Inventive |
| 18 | A | A | A | A | A | B | Inventive |
| 19 | A | A | A | B | A | A | Inventive |
| 20 | A | A | A | A | A | A | Inventive |
| 21 | B | C | C | A | A | A | Comparative |
| 22 | B | C | C | A | A | A | Comparative |

As is shown in Table 4, Ink-sets 12 and 16 to 20 using the vinyl chloride-vinyl acetate-maleic anhydride copolymer VMCA® (being a product name, produced by The Dow Chemical Company) displayed particularly high ejection stability so that deformation and the interruption of the lattice image was not caused. In the comparison of Ink-sets 2 and 16 to 20 in which the ketone type solvent was replaced, it was proved that Ink-sets 12, 16 and 20 using dimethylimidazolidinone, γ-lactone and sulforane, respectively, displayed superior effect in the results of each of the evaluation items for the printed image.

What is claimed is:

1. A non-aqueous ink-set for ink-jet recording comprising one or more inks each comprising a mixed solvent, a pigment and a resin and at least one of colors is constituted by a light colored ink and a dark colored ink different from each other in a pigment concentration,
wherein a ratio ($V_1/V_2$) of viscosity ($V_1$) of the mixed solvent contained in the light colored ink to viscosity ($V_2$) of the mixed solvent contained in the dark colored ink satisfies Expression (1):

$1.1 < V_1/V_2 < 2.5$    Expression (1).

2. The non-aqueous ink-set for ink-jet recording described in claim 1,
wherein viscosity ($V_1$) of the mixed solvent contained in the light colored ink is from 1.0 mPa·s to 3.7 mPa·s.

3. The non-aqueous ink-set for ink-jet recording described in claim 1,
wherein a mass concentration ratio of the pigments contained in the light colored ink to the dark colored ink (being a pigment concentration of the light colored ink/a pigment concentration of the dark colored ink) is from 0.1 to 0.5.

4. The non-aqueous ink-set for ink-jet recording described in claim 1,
wherein a content of the resin contained in the light colored ink and a content of the dark colored ink is not less than 0.1 weight % and not more than 10 weight %.

5. The non-aqueous ink-set for ink-jet recording described in claim 1,
wherein at least on of the mixed solvents contained in the light colored ink and the dark colored ink is a sulfur-containing heterocyclic compound.

6. The non-aqueous ink-set for ink-jet recording described in claim 5,
wherein the sulfur-containing heterocyclic compound is sulfolane.

7. The non-aqueous ink-set for ink-jet recording described in claim 1,
wherein at least one of the mixed solvents contained in the light colored ink and the dark colored ink is a ketone series solvent.

8. The non-aqueous ink-set for ink-jet recording described in claim 7,
wherein the ketone series solvent is 1,3-dimethyl-2-imidazolidinone or a lactone.

9. The non-aqueous ink-set for ink-jet recording described in claim 1,
wherein at least one of the resins contained in the light colored ink and the dark colored ink is a vinyl chloride-vinyl acetate copolymer.

10. The non-aqueous ink-set for ink-jet recording described in claim 1,
wherein at least one of the resins contained in the light colored ink or/and the dark colored ink is a vinyl chloride-vinyl acetate-maleic anhydride copolymer.

11. An ink-jet recording method comprising the step of:
ejecting inks onto a recording medium containing a polyvinyl chloride in a recording side to form an image employing the non-aqueous ink-set for ink-jet recording described in claim 1.

12. The ink-jet recording method described in claim 11,
wherein the image is recorded with a head driving frequency of not less than 10 kHz.

* * * * *